United States Patent
Forsyth (10) Patent No.: US 7,490,526 B2
(45) Date of Patent: Feb. 17, 2009

(54) DUAL CLUTCH POWERSHIFT TRANSMISSION WITH TRANSFER SHAFT

(75) Inventor: John R. Forsyth, Washington, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 86 days.

(21) Appl. No.: 11/736,329

(22) Filed: Apr. 17, 2007

(65) Prior Publication Data

US 2007/0266810 A1 Nov. 22, 2007

Related U.S. Application Data

(60) Provisional application No. 60/802,454, filed on May 22, 2006.

(51) Int. Cl.
*F16H 3/08* (2006.01)
(52) U.S. Cl. .......................... 74/330; 74/331
(58) Field of Classification Search .................. 74/330, 74/331, 340
See application file for complete search history.

(56) References Cited

U.S. PATENT DOCUMENTS

| | | | |
|---|---|---|---|
| 4,860,607 A * | 8/1989 | Numazawa et al. ........... 74/330 |
| 5,890,392 A | 4/1999 | Ludanek et al. |
| 5,966,989 A | 10/1999 | Reed, Jr. et al. |
| 6,427,549 B1 | 8/2002 | Bowen |
| 6,428,438 B1 | 8/2002 | Bowen |
| 6,460,425 B1 | 10/2002 | Bowen |
| 6,499,370 B2 | 12/2002 | Bowen |
| 6,575,866 B2 | 6/2003 | Bowen |
| 6,656,082 B1 | 12/2003 | Yamada et al. |
| 6,860,168 B1 | 3/2005 | Kobayashi |
| 6,881,169 B2 | 4/2005 | Katakura |
| 6,907,801 B2 | 6/2005 | Shimaguchi |
| 6,958,028 B2 | 10/2005 | Janson et al. |
| 6,966,860 B2 | 11/2005 | Heitmann et al. |
| 6,969,335 B2 | 11/2005 | Lorken |
| 7,044,014 B2 | 5/2006 | Janson et al. |
| 7,070,534 B2 | 7/2006 | Pelouch |
| 7,073,407 B2 | 7/2006 | Stefina |
| 7,077,025 B2 | 7/2006 | Janson et al. |
| 7,082,850 B2 | 8/2006 | Hughes |
| 7,083,540 B2 | 8/2006 | Janson et al. |
| 7,114,409 B2 | 10/2006 | Eggert et al. |
| 7,155,993 B2 | 1/2007 | Koenig et al. |
| 7,171,867 B2 | 2/2007 | McCrary et al. |
| 7,246,536 B2 * | 7/2007 | Baldwin ...................... 74/340 |
| 7,272,987 B2 * | 9/2007 | Hughes ....................... 74/340 |

* cited by examiner

*Primary Examiner*—Tisha D Lewis
(74) *Attorney, Agent, or Firm*—Harness, Dickey & Pierce, P.L.C.

(57) ABSTRACT

A dual-clutch powershift transmission for use in a motor vehicle having an engine and a driveline includes an output shaft adapted for connection to the driveline, first and second input shafts, a first engine clutch operable for establishing a releaseable drive connection between the engine and the first input shaft and a second engine clutch operable for establishing a releasable drive connection between the engine shaft and the second input shaft. A first constant-mesh gearset is driven by the first input shaft. A second constant-mesh gearset is driven by the second input shaft. A first shift clutch releasably engages the first gearset to establish a drive connection between the first input shaft and the output shaft. A second shift clutch releasably engages the second gearset to establish a drive connection between the second input shaft and the output shaft.

40 Claims, 6 Drawing Sheets

| RATIOS SHOWN | |
|---|---|
| FIRST | 5.27 |
| SECOND | 3.52 |
| THIRD | 2.34 |
| FOURTH | 1.56 |
| FIFTH | 1.16 |
| SIXTH | 0.92 |
| REVERSE | 5.14 |
| FINAL DRIVE | 3.35 |

FIG. 6

DUAL CLUTCH POWERSHIFT TRANSMISSION WITH TRANSFER SHAFT

CROSS-REFERENCE TO RELATED APPLICATIONS

This application claims the benefit of U.S. Provisional Application No. 60/802,454, filed on May 22, 2006. The disclosure of the above application is incorporated herein by reference.

FIELD

The present invention relates generally to transmissions for use in motor vehicles and, more particularly, to a dual-clutch automated transmission applicable for use in drive and rear-wheel drive vehicles.

BACKGROUND

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated dual-clutch transmissions have been developed which can be powershifted to permit gearshifts to be made under load. Examples of such automated manual transmissions are shown in U.S. Pat. Nos. 5,966,989 and 5,890,392. While such powershift dual-clutch transmissions overcome several drawbacks associated with conventional single-clutch automated transmissions, a need exists to develop simpler and more robust transmissions which advance the automotive transmission technology.

SUMMARY OF THE INVENTION

Accordingly, the present disclosure provides a dual-clutch transmission and a control system for permitting automatic shifting of the dual-clutch transmission.

In one form of the present invention, an automated dual-clutch multi-speed transmission is adapted to transfer power from the engine to the driveline of a motor vehicle. The transmission includes a single output mesh that allows the center distance between the transaxle input shaft and the differential centerline to be easily changed. This concept also provides deep transmission ratios that, in turn, allow for short final drive ratios. A differential having a reduced ring gear diameter may be implemented to help reduce interference concerns with other chassis components such as steering gears.

In another form, the present invention provides a dual-clutch transmission for use in a motor vehicle having an engine and a driveline and which includes an output shaft adapted for connection to the driveline, first and second input shafts selectively drivable by the engine and first and second engine clutches. The first engine clutch is operable to establish a releasable drive connection between the engine and the first input shaft. The second engine clutch is operable to establish a releasable drive connection between the engine and the second input shaft. A first constant-mesh gearset is driven by the first input shaft. A second constant-mesh gearset is driven by the second input shaft. A third constant-mesh gearset is selectively driven by the first gearset or the second gearset. The third gearset drives the output shaft. A first shift clutch is operable to releasably drivingly couple the first gearset and the third gearset. A second shift clutch is operable to releasably drivingly couple the second gearset and the third gearset.

In another form, the present disclosure provides a dual-clutch transmission for use in a motor vehicle having an engine and a driveline, including an output shaft adapted for connection to the driveline, first and second input shafts, a first engine clutch operable for establishing a releasable drive connection between the engine and the first input shaft and a second engine clutch operable for establishing a releasable drive connection between the engine shaft and the second input shaft. A first constant-mesh gearset is driven by the first input shaft. A second constant-mesh gearset is driven by the second input shaft. A first shift clutch releasably engages the first gearset to establish a drive connection between the first input shaft and the output shaft. A second shift clutch releasably engages the second gearset to establish a drive connection between the second input shaft and the output shaft.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1 through 4 of the accompanying drawings, a dual-clutch automated transmission, hereinafter referred to as transmission 10, will now be described. Transmission 10 is driven by the output of an engine 12 and generally includes a first engine clutch 14, a second engine clutch 16, a first input shaft 18, a second input shaft 20, a transfer shaft 22, a reverse idler shaft 24, a plurality of gearsets 26, an output shaft 28, a final drive unit 30, and a shift control system 32.

Figure 1:
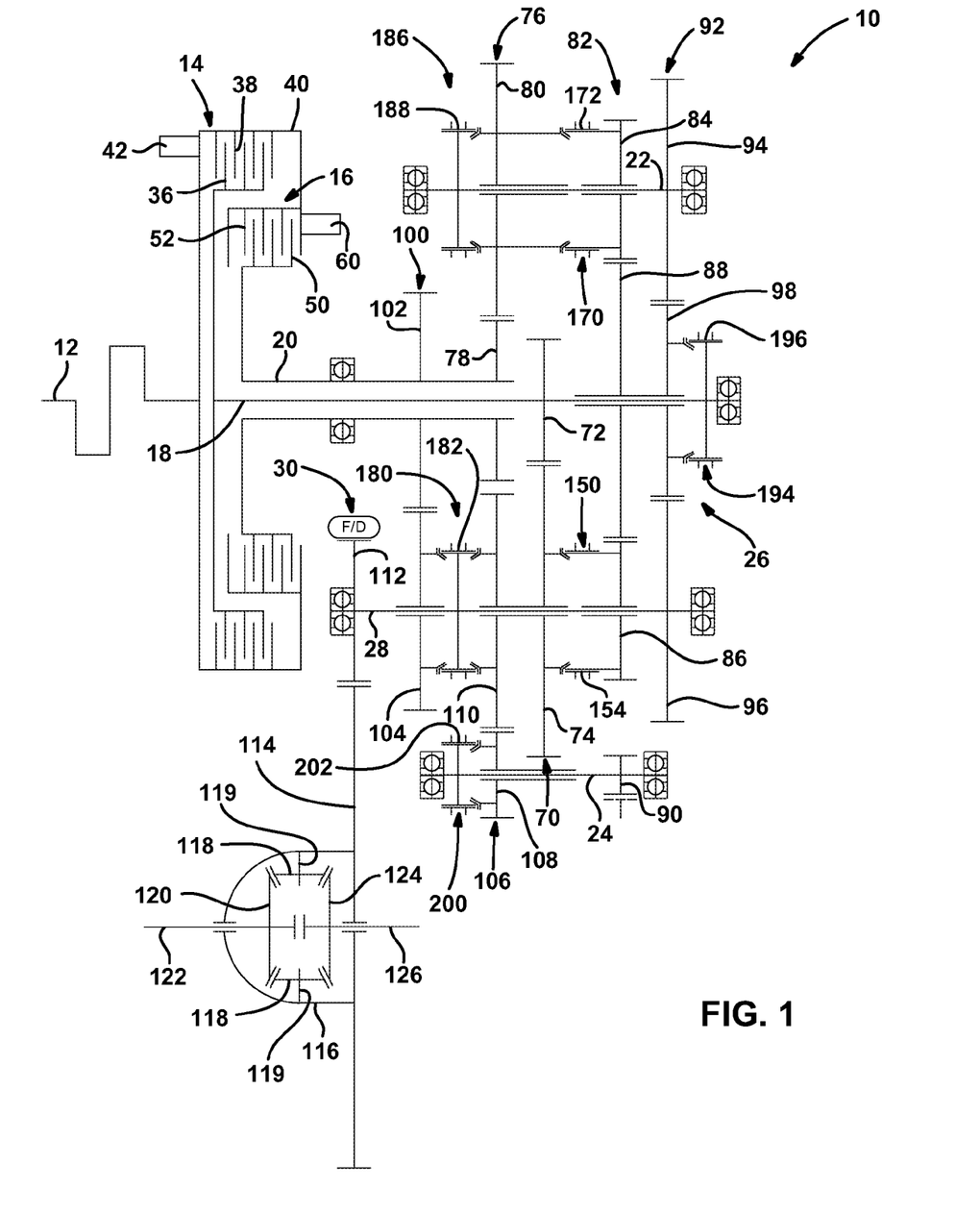
FIG. 1 is a schematic view of a dual-clutch automated transmission according to the principles of the present disclosure.

First engine clutch 14 is a hydraulically-actuated spring-apply plate-type clutch which is normally operable in its engaged state to establish a drive connection between the output of engine 12 and first input shaft 18. Likewise, second engine clutch 16 is a hydraulically-actuated spring-apply plate-type clutch normally operable in its engaged state to establish a drive connection between the output of engine 12 and second input shaft 20.

Figure 2:
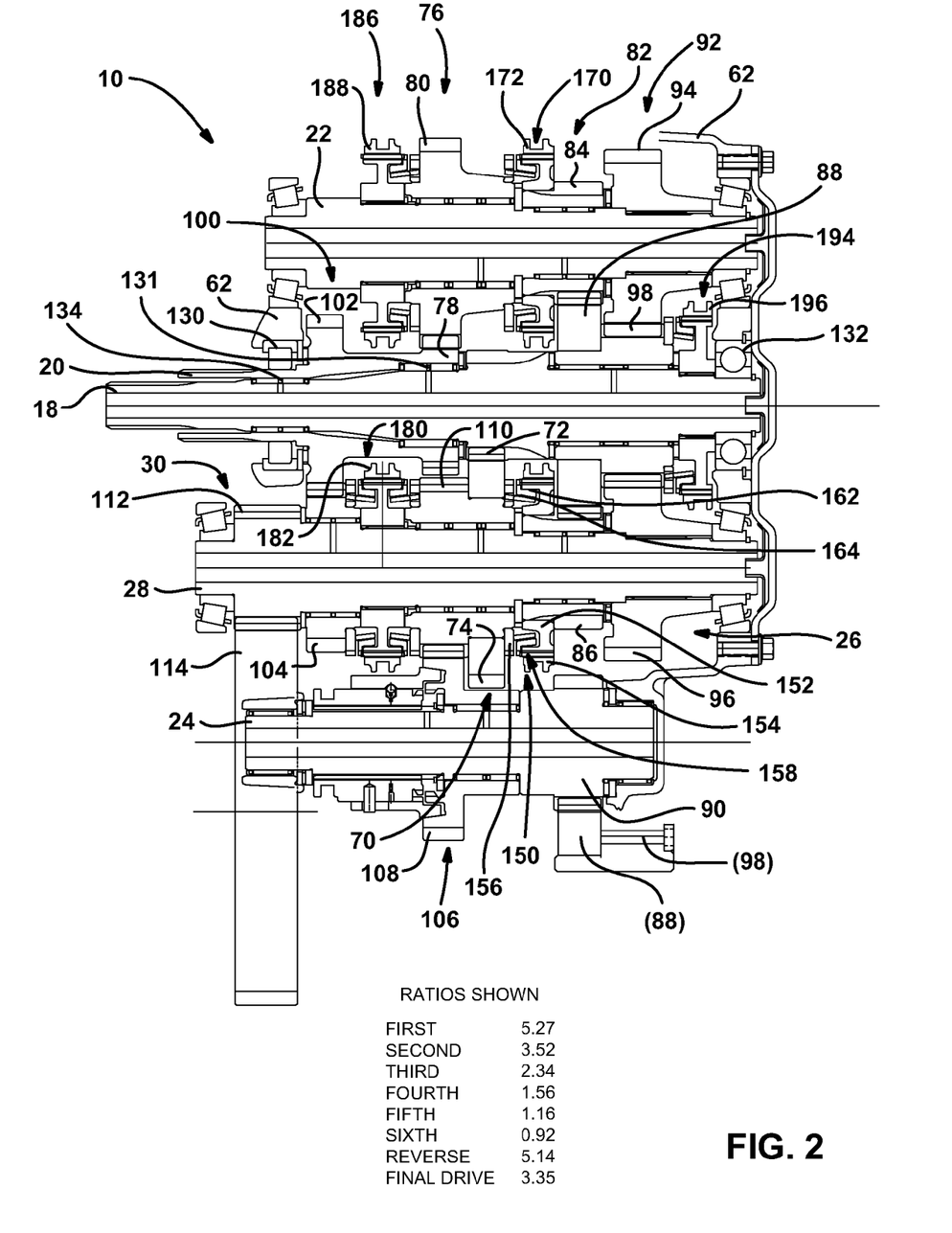
FIG. 2 is a fragmentary, cross-sectional flattened view of the dual-clutch automated transmission shown in FIG. 1.
Figure 3:
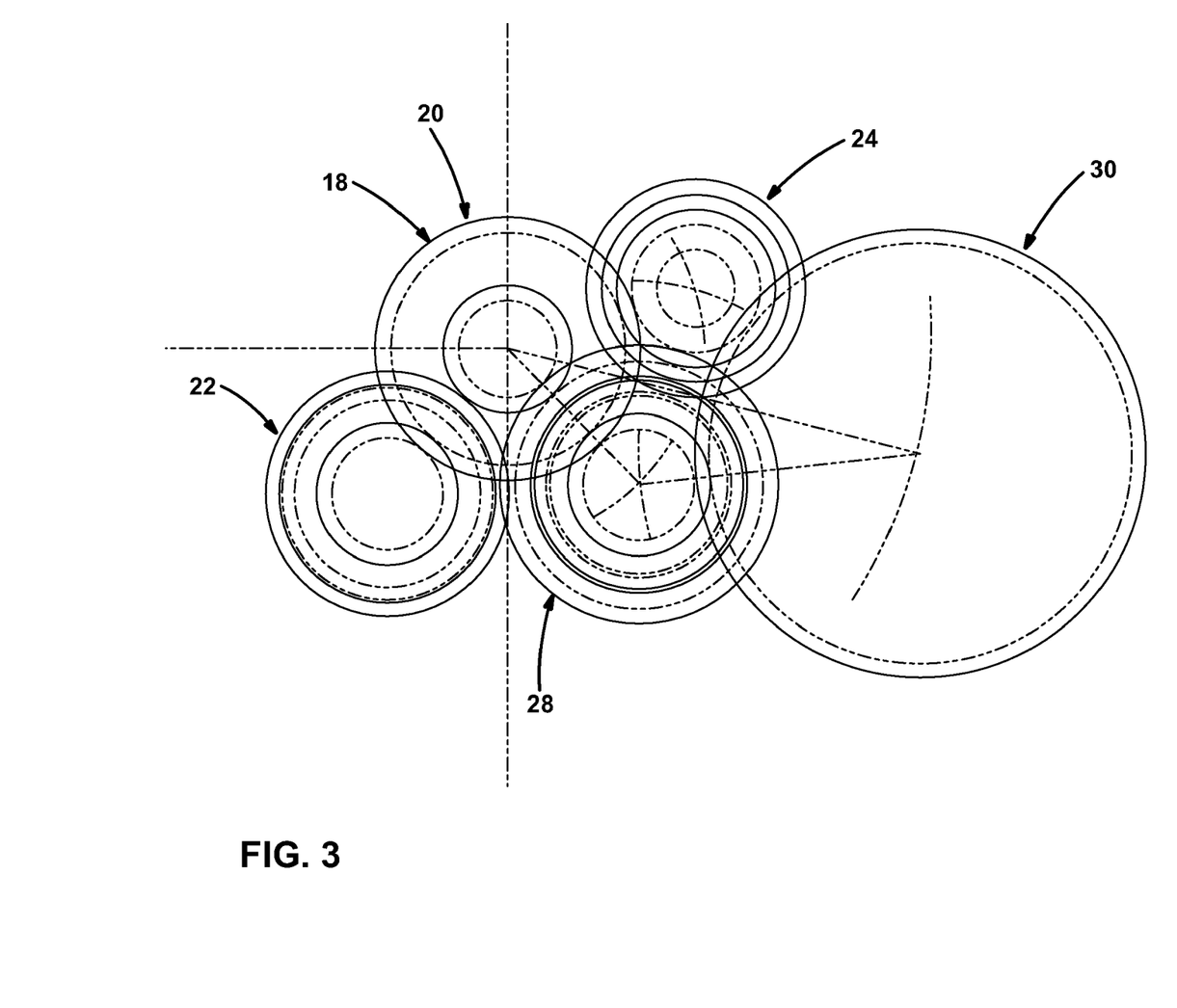
FIG. 3 is a partial end view depicting the relative position of the rotatable shafts within the dual-clutch automated transmission shown in FIG. 1.

First engine clutch 14 is a multi-plate clutch having a plurality of inner clutch plates 36 fixed for rotation with first input shaft 18 and interleaved with a plurality of outer clutch plates 38 splined to a drum 40 that is fixed to engine output 12. A first clutch actuator 42 is provided to apply a force to cause inner clutch plates 36 and outer clutch plates 38 to separate from one another and cease the transfer of torque through first engine clutch 14. In the embodiment shown, first clutch actuator 42 is a hydraulically-actuated device that controls the magnitude of torque transferred through first engine clutch 14. First clutch actuator 42 may also fully release first engine clutch 14 so no torque is transferred therethrough.

Second engine clutch 16 includes a plurality of inner clutch plates 50 in driving engagement with second input shaft 20 and interleaved with a plurality of outer clutch plates 52 splined with drum 40. As previously described, housing 40 is fixed to engine output 12. Second engine clutch 16 is also a normally closed clutch that transmits torque when not acted upon by an external force. In the closed condition, inner clutch plates 50 frictionally engage outer clutch plates 52 and torque is transferred between engine output 12 and second input shaft 20. Inner clutch plates 50 and outer clutch plates 52 are axially moveable to positions spaced apart from one another where second engine clutch 16 does not transfer torque. A second clutch actuator 60 is operable to control second engine clutch 16 to selectively transfer a predetermined quantity of torque between engine output 12 and second input shaft 20 or fully release the clutch plates from one another. As will be detailed, shift control system 32 is operable to control clutch actuators 42 and 60 and, in turn, the engagement and release of engine clutches 14 and 16. While it is contemplated that first clutch actuator 42 and second clutch actuator 60 are hydraulically operated devices, other types of power-operated actuator including electrically-powered actuators are within the scope of the present disclosure.

As is conventional, all of the shafts, gearset 36 and final drive unit 30 are all rotatably supported in a transmission housing 62. The plurality of gearsets 26 includes a first gearset 70 having a first drive gear 72 fixed for rotation with first input shaft 18 that is meshed with a first speed gear 74 rotatably supported on output shaft 28. A second gearset 76 includes a second drive gear 78 fixed for rotation with second input shaft 20 that is meshed with a second speed gear 80 rotatably supported on transfer shaft 22. A third gearset 82 includes a third speed gear 84 rotatably supported on transfer shaft 22, a fourth speed gear 86 rotatably supported on output shaft 28, and a fifth speed gear 88 rotatably supported on first input shaft 18 that is in meshed engagement with third speed gear 84 and fourth speed gear 86. Third gearset 82 also includes a reverse drive gear 90 fixed to reverse idler shaft 24 that is meshed with fifth speed gear 88. A fourth gearset 92 includes a third drive gear 94 fixed for rotation with transfer shaft 22, a fourth drive gear 96 fixed for rotation with output shaft 28 and a sixth speed gear 98 rotatably supported on first input shaft 18 that is meshed with third drive gear 94 and fourth drive gear 96. It should be appreciated that fifth speed gear 88 and sixth speed gear 98 are fixed to one another to define a compound gear rotatably supported on first input shaft 18. A fifth gearset 100 includes a fifth drive gear 102 fixed for rotation with second input shaft 20 that is meshed with a seventh speed gear 104 rotatably supported on output shaft 28. A reverse gearset 106 includes a first reverse speed gear 108 rotatably supported on reverse idler shaft 24 that is meshed with a second reverse speed gear 110 rotatably supported on output shaft 28. Second reverse speed gear 110 is fixed to first speed gear 74 to define a compound gear rotatably supported on output shaft 28.

Final drive unit 30 includes a first output gear 112 fixed for rotation with output shaft 28 that is meshed with a second output gear 114. A differential housing 116 is fixed to second output gear 114 for rotation therewith. Pinion gears 118 are rotatably supported by pins 119 fixed to housing 116. A first side gear 120 is fixed to a first driveshaft 122 and meshed with each pinion gear 118. Likewise, a second side gear 124 is fixed to a second driveshaft 126 and meshed with each pinion gear 118. As is known, driveshafts 122 and 126 are typically used to drive a pair of front wheels in a motor vehicle.

To provide a compact, robust package, second input shaft 20 concentrically surrounds first input shaft 18. Second input shaft 20 is supported at one end of housing 62 via a bearing assembly 130 and at its other end by a bearing assembly 131 supported by first input shaft 18. First input shaft 18 is, in turn, supported at one end by a bearing assembly 132 located in housing 162 and at its other end by a bearing assembly 134 positioned within second input shaft 20.

Shift control system 32 includes a plurality of electrically-actuated synchronizers which are operable for selectively coupling a selected speed gear to other speed gears, first input shaft 18, transfer shaft 22, reverse idler shaft 24 or output shaft 28 for establishing six forward and one reverse speed ratio drive connections. The electrically-actuated synchronizers include a first synchronizer 150 operable for selectively coupling/releasing first speed gear 74 to/from fourth speed gear 86. First synchronizer 150 includes a first hub 152 fixed to fourth speed gear 86, a first sleeve 154 supported for rotation with and axial sliding movement on hub 152, a first clutch plate 156 fixed to first speed gear 74, and a cone-type synchronizer assembly 158. As shown in FIG. 2, sleeve 154 is illustrated in its neutral position.

Cone-type synchronizer assembly 158 is a single-cone arrangement having an outer blocker ring 162 and a reaction ring 164. The cone torque developed between the facing conical surfaces of the blocker ring 162 and reaction ring 164 inhibits first sleeve 154 from becoming drivingly engaged with clutch plate 156 until speed synchronization between fourth speed gear 86 and first speed gear 74 is complete. Once speed synchronization has occurred, first sleeve 154 is free to move to a position engaged with first clutch plate 156, thereby drivingly interconnecting fourth speed gear 86 and first speed gear 74. A first synchronizer actuator 166 (FIG. 4) is operable to move first sleeve 154 between the neutral and engaged positions. It is contemplated that first actuator 166 may be electrically or hydraulically powered. First synchronizer actuator 166 is in communication with a controller 168 of shift control system 32.

Shift control system 32 also includes a second synchronizer 170 operable for selectively coupling/releasing second speed gear 80 to/from third speed gear 84. Second synchronizer 170 includes a second sleeve 172 axially movable between neutral and engaged positions. A second synchronizer actuator 174 is operable to move second sleeve 172 between its neutral and engaged positions. Second synchronizer actuator 174 is also controlled by controller 168.

A third synchronizer 180 is operable for selectively coupling/releasing second reverse speed gear 110 and seventh speed gear 104 to/from output shaft 28. Third synchronizer 180 includes a bi-directionally movable third sleeve 182 movable from a central neutral position to one of two engaged positions. A third synchronizer actuator 184 is operable to move third synchronizer sleeve 182 and is in controlled by controller 168.

A fourth synchronizer 186 is operable for selectively coupling/releasing second speed gear 80 to/from transfer shaft 22. Fourth synchronizer 186 includes an axially movable fourth sleeve 188 that may be selectively positioned in a neutral position or an engaged position. A fourth synchronizer actuator 190 is operable to selectively move fourth sleeve 188 in response to control signals from controller 168.

A fifth synchronizer 194 is operable for selectively coupling/releasing first input shaft 18 to/from sixth speed gear 98. Fifth synchronizer 194 includes a fifth sleeve 196 that is axially movable between a neutral position and an engaged position. A fifth synchronizer actuator 198 is operable to move fifth sleeve 196 between its neutral and engaged positions. Fifth actuator 198 is in communication with controller 168.

A sixth synchronizer 200 is operable for selectively coupling/releasing first reverse speed gear 108 to/from reverse idler shaft 24. Sixth synchronizer 200 includes an axially slidable sixth sleeve 202. A sixth synchronizer actuator 204 is operable to selectively move sixth sleeve 202 between a neutral position and an engaged position. Sixth synchronizer actuator 204 is controlled by and in communication with controller 168.

Figure 4:
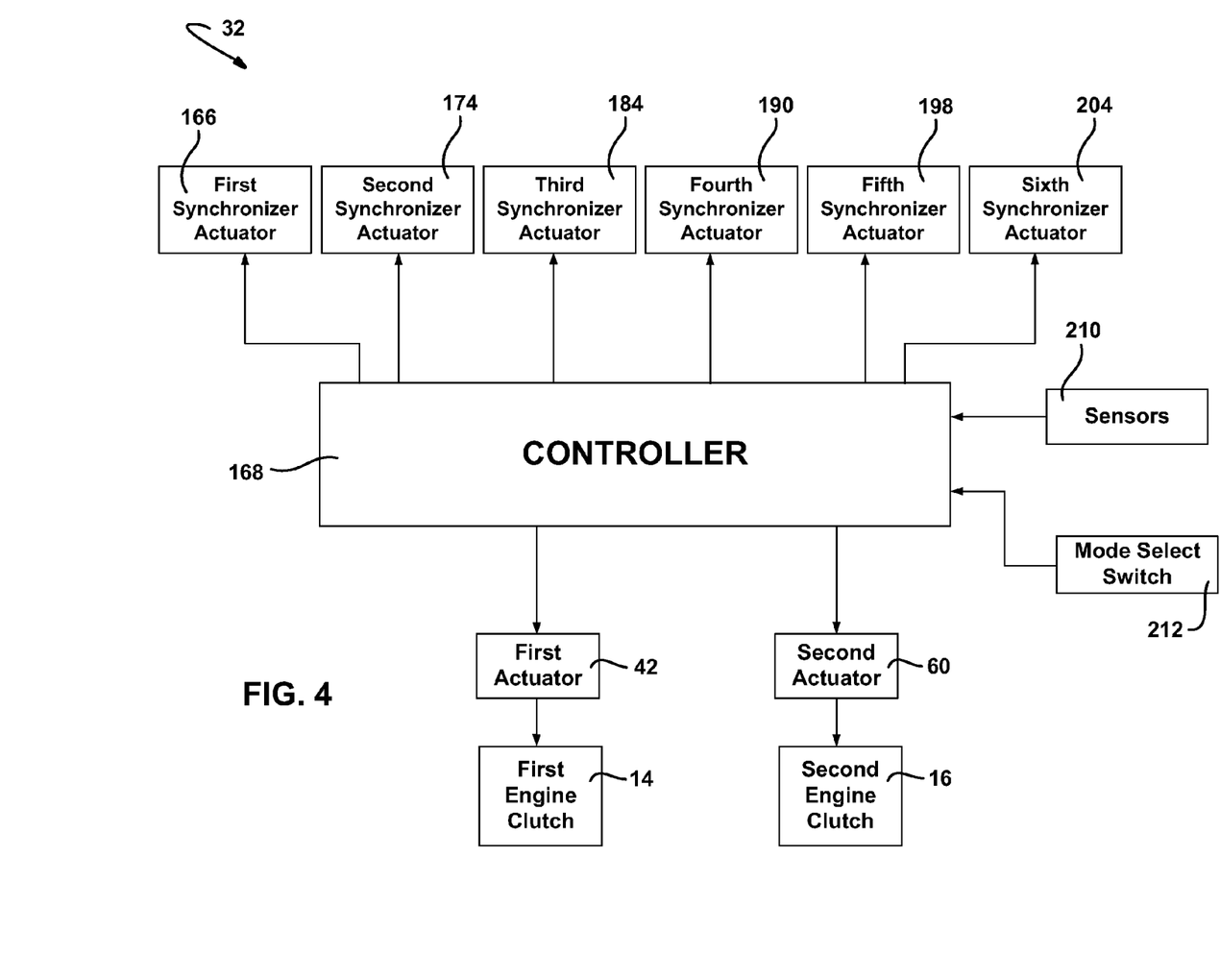
FIG. 4 is a diagrammatical illustration of the transmission control system adapted for use with the dual-clutch automated transmission shown in FIG. 1.

FIG. 4 depicts shift control system 32 to include controller 168 which receives various sensor input signals, denoted diagrammatically by block 210. Controller 168 is an electronically-controlled unit capable of receiving data from the vehicle sensors and generating output signals in response to the sensor input signals. The input signals delivered to controller 168 can include, without limitation, engine speed, throttle position, brake status, first input shaft speed, second input shaft speed, transfer shaft speed, reverse idler shaft speed and output shaft speed. Controller 168 is operable to coordinate and monitor actuation of all the electrically-controlled devices associated with shift control system 32, so as to permit power-shifted sequential gear changes automatically without any input from the vehicle operator. As such, transmission 10 is capable of being smoothly shifted automatically without power interruption.

If desired, a manually-operable mode selector switch 212 can be provided to shift transmission 10 from its automatic shift mode to a manual shift mode. Mode switch 212 would, when actuated, allow a vehicle operator to shift the gear shift lever manually to effect sequential gear shifts without the use of a clutch pedal. However, controller 168 would only permit the selective gear shift to be completed if the current vehicle characteristics (i.e., engine speed, vehicle speed, etc.) permit completion of a requested shift.

To operate the vehicle, engine 12 is started with the gear shift lever in its PARK position. Each of first engine clutch 14 and second engine clutch 16 are in the normally engaged state with their respective drive connections completed. However, each of the power-operated synchronizers is released with each shift sleeve located in its neutral position such that no drive torque is delivered to output shaft 28. When the vehicle operator moves the gear shift lever from the PARK position to the DRIVE position, first clutch actuator 42 is operated to place first engine clutch 14 in its open state. First synchronizer 150 is actuated to cause first sleeve 154 to drivingly interconnect first speed gear 74 and fourth speed gear 86. Thereafter, first clutch actuator 42 is controlled to allow normally closed first engine clutch 14 to transfer torque from first input shaft 18 through first drive gear 72, first speed gear 74, fourth speed gear 86, fifth speed gear 88, sixth speed gear 98 and fourth drive gear 96 to output shaft 28 so as to establish the first forward speed ratio drive connection between first input shaft 18 and output shaft 28. As previously described, final drive unit 30 is drivingly coupled to output shaft 28. First engine clutch 14 may be gradually engaged to smoothly accelerate the vehicle.

If controller 168 determines that an up-shift is required, second clutch actuator 60 is controlled to place second engine clutch 16 in its open or released state. Second synchronizer 170 is actuated to cause second sleeve 172 to drivingly interconnect second speed gear 80 and third speed gear 84. Controller 168 then coordinates the release of first engine clutch 14 and the re-engagement of second engine clutch 16. Once second engine clutch 16 is re-engaged, torque is transferred from second input shaft 20 through second drive gear 78, second speed gear 80, third speed gear 84, fifth speed gear 88, sixth speed gear 98 and fourth drive gear 96 to output shaft 28 so as to establish the second forward speed ratio drive connection. Once first engine clutch 14 is completely released, controller 168 causes first synchronizer actuator 166 to return first sleeve 154 to its neutral position, thereby disconnecting first speed gear 74 and fourth speed gear 86. The power supply to first clutch actuator 42 may be discontinued to allow first engine clutch 14 to operate in its normally closed state. At this time, transmission 10 is operable in an energy conservation mode.

If controller 168 determines that transmission 10 will be operated in a certain drive gear for a predetermined amount of time, each of the synchronizers associated with the gears not currently transferring torque is moved to their normally centered position. Furthermore, the engine clutch that is not transferring torque is allowed to return to its normally closed position. During this mode of operation, energy is not required to be provided to either of first clutch actuator 42 or second clutch actuator 60. When transmission 10 is in the energy conservation mode as previously described, transmission 10 operates very similarly to a manual transmission as opposed a typical automatic transmission. Typical automatic transmissions require energy to be continuously supplied to cause the interleaved plates of the clutch packs to be forced into contact with one another to transfer torque. The normally closed clutches of transmission 10 alleviate the need for a continuous supply of hydraulic pressure or electrical energy to transfer torque at a predetermined gear ratio. It should be appreciated that transmission 10 may be operated in the energy conservation mode when operating within any one of the speed ratios.

Continuing the description of up-shifting transmission 10, if controller 168 determines that a 2-3 shift is required, first clutch actuator 42 causes inner clutch plates 36 to become disengaged from outer clutch plates 38 such that torque is no longer transferred between engine output 12 and first input shaft 18. Third synchronizer 180 is actuated to cause third sleeve 182 to drivingly interconnect second reverse speed gear 110 to output shaft 28. A clutch-to-clutch 2-3 power shift occurs as controller 168 controls first clutch actuator 42 to engage first engine clutch 14 while second clutch actuator 60 is controlled to disengage second engine clutch 16. Once first engine clutch 14 is engaged, power transfers from first input shaft 18 through first drive gear 72, the compound gear including first speed gear 74 and second reverse speed gear 110 and third synchronizer 180 to output shaft 28.

Other sequential shifts such as 3-4, 4-5 and 5-6 up-shifts are similarly executed by controller 168 anticipating the next shift and disengaging one of first engine clutch 14 and second engine clutch 16 to allow an appropriate synchronizer to be actuated. Accordingly, a detailed description of the shifting process will not be provided but a description of the power flow path for each drive gear follows.

In the fourth forward speed ratio drive connection, power flows from second input shaft 20 through second drive gear 78, second speed gear 80, fourth synchronizer 186, transfer shaft 22, third drive gear 94, sixth speed gear 98 and fourth drive gear 96 to output shaft 28. A fifth forward drive gear ratio is obtained by transferring torque from first input shaft 18 through fifth synchronizer 194, sixth speed gear 98 and fourth drive gear 96 to output shaft 28. A sixth forward drive gear ratio is provided by transferring torque from second input shaft 20 through fifth drive gear 102, seventh speed gear 104 and third synchronizer 180 to output shaft 28.

A reverse drive speed ratio torque path includes transferring torque from first input shaft 18 through first drive gear 72, the compound gear including first speed gear 74 and second reverse speed gear 110, first reverse speed gear 108, sixth synchronizer 200, reverse idler shaft 24, reverse drive gear 90, fifth speed gear 88, sixth speed gear 98, fourth drive gear 96 to output shaft 28. One skilled in the art will appreciate that power transfer for the reverse, first, third and fifth forward drive gears are provided by torque transferred through first input shaft 18 while a torque supply for the second, fourth and sixth forward drive gears is provided by second input shaft 20. In this manner, sequential clutch-to-clutch powershifts may occur.

Figure 5:
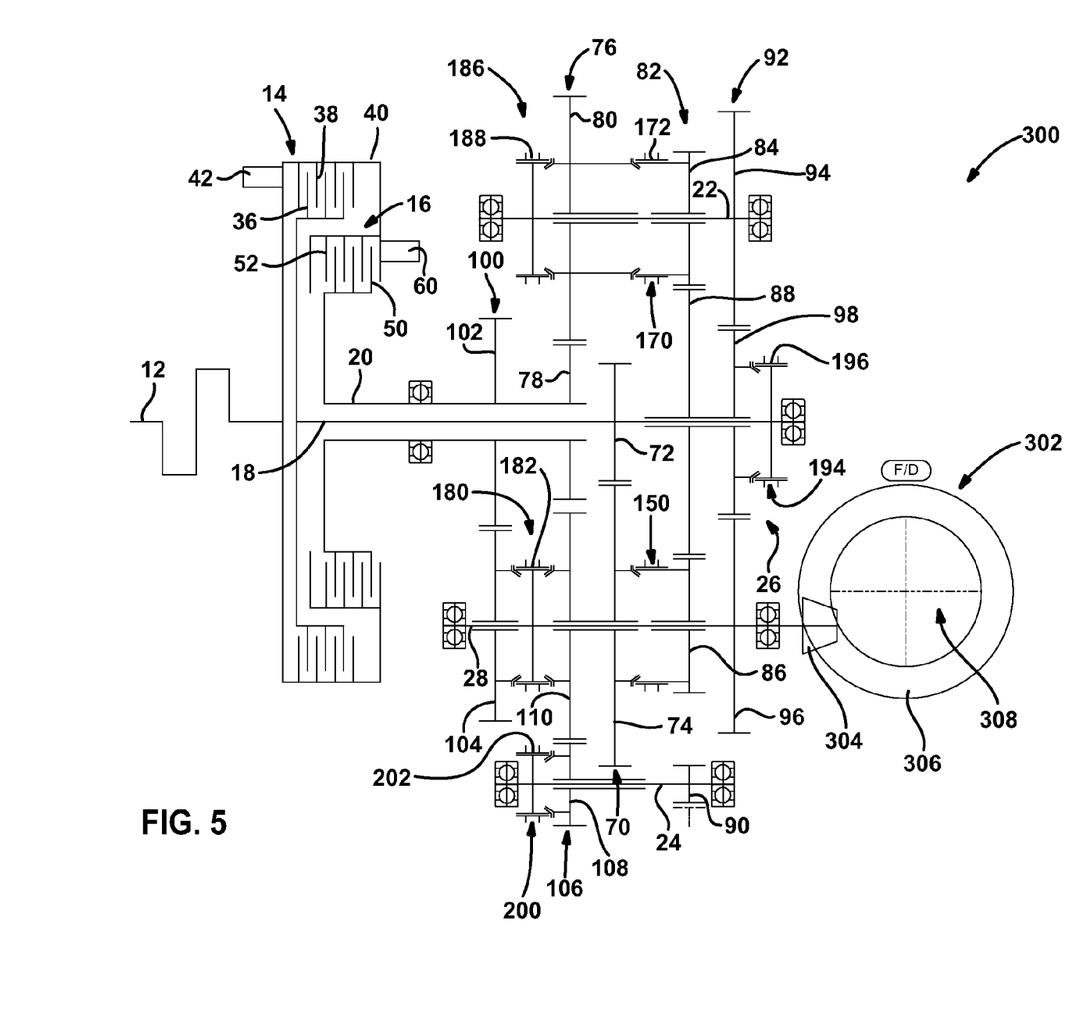
FIG. 5 is a schematic view of a dual-clutch automated transmission according to another preferred embodiment of the present disclosure.

FIG. 5 depicts an alternate embodiment dual-clutch multi-speed transmission 300. Transmission 300 is substantially similar to transmission 10 except that a final drive unit 302 is positioned at an opposite end of output shaft 28 than depicted in FIG. 1. Because the remaining components of transmission 10 are substantially identical in shape and function to those previously described, like elements will retain their previously introduced reference numerals.

Final drive unit 302 includes a hypoid gearset having a pinion gear 304 fixed to output shaft 28. Pinion gear 304 is in meshed engagement with a ring gear 306. Ring gear 306 drives the housing of a differential assembly 308. Differential assembly 308 provides torque to a pair of output shafts (not shown). By positioning final drive unit 302 rearward of each of the other transmission components, transmission 300 lends itself to a rear transaxle type application.

Figure 6:
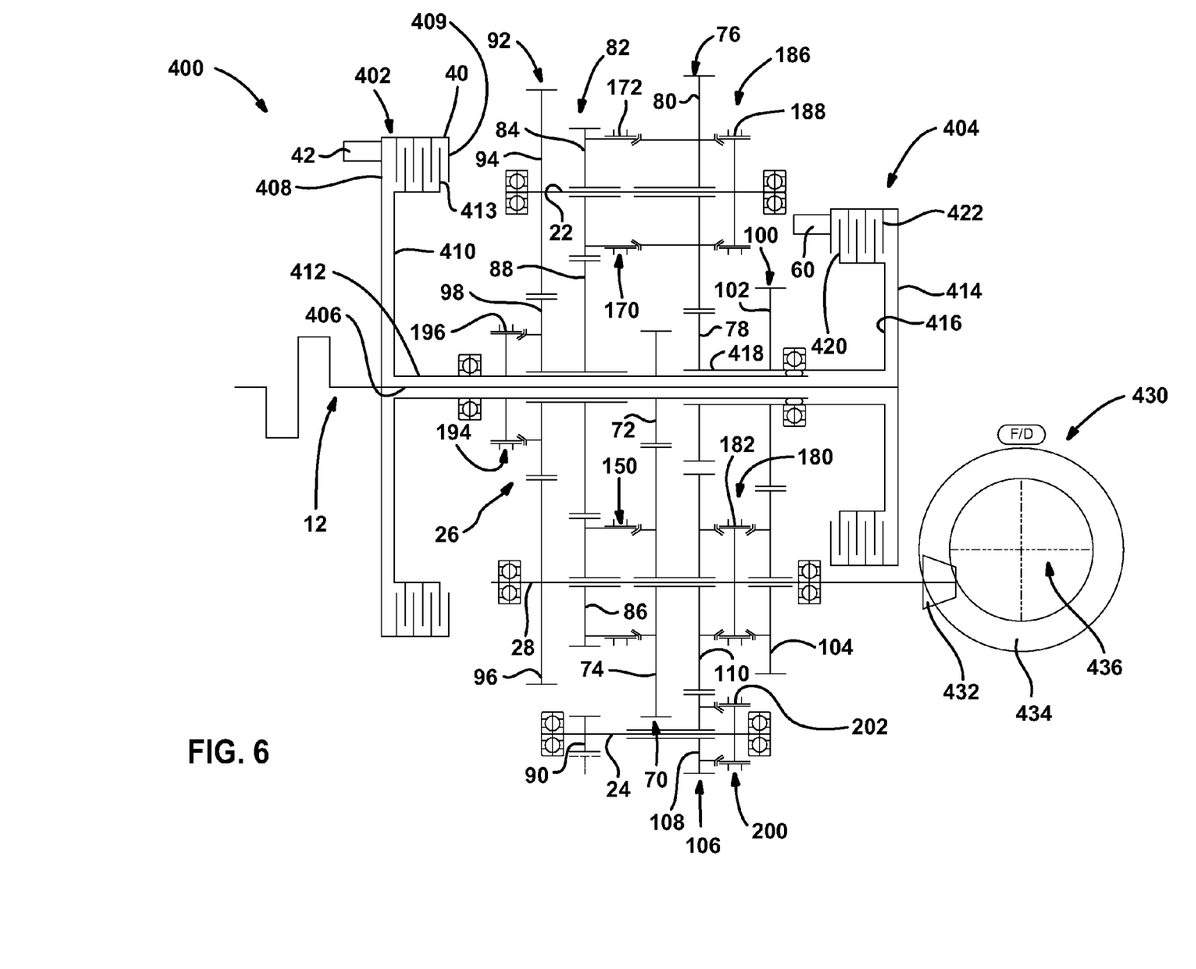
FIG. 6 is a schematic view of a dual-clutch automated transmission according to another preferred embodiment of the present disclosure.

FIG. 6 depicts another alternate embodiment dual-clutch multi-speed transmission 400. Transmission 400 is substantially similar to transmissions 10 and 300 except that a first engine clutch 402 is spaced apart from a second engine clutch 404. Accordingly, like element will retain their previously introduced reference numerals. First engine clutch 402 is positioned at a first end of an input shaft 406 while second engine clutch 404 is positioned at an opposite end of input shaft 406. First engine clutch 402 includes a drum housing 408 fixed for rotation with input shaft 406. Outer clutch plates 409 are in splined engagement with housing 408. A hub 410 is fixed to a first tubular input shaft 412. Inner clutch plates 413 are in splined engagement with hub 410. First tubular input stub shaft 412 encompasses a portion of input shaft 406 and is rotatable relative thereto. As described in relation to the previous embodiments, first engine clutch 402 is a normally-closed clutch operable to drivingly interconnect engine output 12 and first input stub shaft 412. In the embodiment depicted in FIG. 6, first input stub shaft 412 performs the functions described in relation to first input shaft 18.

Second engine clutch 404 includes a drum housing 414 coupled to the opposite end of input shaft 406. A hub 416 is fixed to a second tubular input stub shaft 418. Inner clutch plates 420 are coupled to hub 416 while outer clutch plates 422 are coupled to drum housing 414. Second engine clutch 404 is a normally-closed clutch operable to drivingly interconnect engine output 12 and second input stub shaft 418. Second input stub shaft 418 functions substantially similarly to second input shaft 20 previously described.

By axially spacing apart first engine clutch 402 and second engine clutch 404, each engine clutch may be more efficiently cooled. Additionally, the relative sizes of first engine clutch 402 and second engine clutch 404 need not be dependant upon one another because second engine clutch 404 is no longer packaged within an envelope defined by first engine clutch 402. A final drive unit 430 includes a pinion gear 432 fixed to output shaft 28. A ring gear 434 is in meshed engagement with pinion gear 432. A differential unit 436 is drivingly coupled to ring gear 434. Final drive unit 430 is rearwardly positioned of each of the other components of transmission 400. Accordingly, transmission 400 lends itself for use as a rear transaxle of a vehicle. As will be understood from comparison of the arrangement of gearset 26 in both transmissions 10 and 400, the powershifting function and torque flow paths through the gearsets and synchronizers are identical. While the physical arrangement of the components of transmission 400 is different than that of transmission 10, it will be appreciated that both dual-clutch powershifting automatic transmissions include the same novel packaging and torque flow arrangements.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A dual-clutch transmission for use in a motor vehicle having an engine and a driveline, comprising:
    a first input shaft selectively drivable by the engine;
    a second input shaft selectively drivable by the engine;
    a first engine clutch operable to establish a releasable drive connection between the engine and the first input shaft;
    a second engine clutch operable to establish a releasable drive connection between the engine and the second input shaft;
    an output shaft adapted for connection to the driveline;
    a first constant-mesh gearset being driven by the first input shaft, the first gearset including a first gear fixed to one of the first input shaft and the output shaft and a second gear rotatably supported on the other of the first input shaft and the output shaft;
    a second constant-mesh gearset being driven by the second input shaft;
    a third constant-mesh gearset being selectively driven by the first gearset or the second gearset, wherein the third gearset drives the output shaft;
    a first shift clutch operable to releasably drivingly couple the first gearset and the third gearset; and
    a second shift clutch operable to releasably drivingly couple the second gearset and the third gearset.

2. The dual-clutch transmission of claim 1 further including a transfer shaft.

3. The dual-clutch transmission of claim 2 wherein the second gearset includes a first gear fixed to one of the second input shaft and the transfer shaft and a second gear rotatably supported on the other of the second input shaft and the transfer shaft.

4. The dual-clutch transmission of claim 3 wherein the third gearset includes a first gear rotatably supported on the output shaft, a second gear rotatably supported on the first input shaft and a third gear rotatably supported on the transfer shaft.

5. The dual-clutch transmission of claim 3 wherein the third gearset includes a gear fixed to the output shaft.

6. The dual-clutch transmission of claim 2 wherein the first and second engine clutches and the first and second shift clutches are power-operated devices controlled by a controller for automatically shifting sequentially between a first gear ratio established by the first gearset and the third gearset and a second gear ratio established by the second gearset and the third gearset.

7. The dual-clutch transmission of claim 6 further including a third shift clutch operable to releasably drivingly couple the first gearset and the output shaft and a fourth shift clutch operable to releasably drivingly couple the second gearset and the transfer shaft.

8. The dual-clutch transmission of claim 7 wherein the third and fourth shift clutches are power-operated devices controlled by the controller for automatically shifting seguentially between the third gear ratio established by the first gearset and the fourth gear ratio established by the second gearset and the third gearset.

9. The dual-clutch transmission of claim 8 further including a fifth shift clutch operable to releasably drivingly couple the first input shaft and the third gearset, wherein a fifth gear ratio is established by the third gearset.

10. The dual-clutch transmission of claim 9 further including a fourth gearset driven by the second input shaft.

11. The dual-clutch transmission of claim 10 wherein the third shift clutch is selectively operable to drivingly couple the fourth gearset to the output shaft to define a sixth gear ratio.

12. The dual-clutch transmission of claim 1 further including a differential in constant driving engagement with the output shaft.

13. The dual-clutch transmission of claim 1 wherein the second input shaft concentrically encompasses a portion of the first input shaft.

14. The dual-clutch transmission of claim 1 wherein the first gearset includes a gear rotatably supported on a reverse idler shaft, the transmission further including a third shift clutch operable to releasably drivingly couple the first gearset to the reverse idler shaft.

15. A dual-clutch transmission for use in a motor vehicle having an engine and a driveline, comprising:
a first input shaft;
a second input shaft;
a first engine clutch operable for establishing a releasable drive connection between the engine and the first input shaft;
a second engine clutch operable for establishing a releasable drive connection between the engine and the second input shaft;
an output shaft adapted for connection to the driveline;
a first constant-mesh gearset driven by the first input shaft;
a second constant-mesh gearset driven by the second input shaft;
a third constant-mesh qearset selectively driveable by the first qearset;
a fourth constant-mesh ciearset driven by the third ciearset and driving the output shaft;
a first shift clutch for releasably engaging the first gearset to establish a drive connection between the first input shaft and the output shaft; and
a second shift clutch for releasably engaging the second gearset to establish a drive connection between the second input shaft and the output shaft.

16. The dual-clutch transmission of claim 15 further including a third shift clutch operable to releasably drivingly couple the first gearset and the third gearset.

17. The dual-clutch transmission of claim 15 wherein one gear of the third gearset is rotatably supported by the first input shaft and wherein another gear of the third gearset is rotatably supported by the output shaft.

18. The dual-clutch transmission of claim 15 wherein one gear of the fourth gearset is rotatably supported by the second input shaft and another gear of the fourth gearset is fixed to the output shaft.

19. The dual-clutch transmission of claim 15 wherein one gear of the first gearset is fixed to the first input shaft and another gear of the first gearset is rotatably supported by the output shaft.

20. The dual-clutch transmission of claim 15 wherein one gear of the second gearset is fixed to the second input shaft and where another gear of the second gearset is rotatably supported by the output shaft.

21. The dual-clutch transmission of claim 15 further including a transfer shaft rotatably supporting a gear of the third gearset and a gear of a fifth constant-mesh gearset, the fifth constant-mesh gearset being driven by the second input shaft.

22. The dual-clutch transmission of claim 21 further including a third shift clutch operable to selectively drivingly couple the first gearset and the third gearset, and a fourth shift clutch operable to releasably drivingly couple the third gearset and the fifth gearset.

23. The dual-clutch transmission of claim 22 further including a fifth shift clutch operable to releasably drivingly couple the fifth gearset and the transfer shaft.

24. The dual-clutch transmission of claim 23 further including a sixth shift clutch operable to releasably drivingly couple the fourth gearset and the first input shaft.

25. The dual-clutch transmission of claim 15 wherein the second input shaft concentrically encompasses a portion of the first input shaft.

26. The dual-clutch transmission of claim 15 further including a reverse idler shaft in driving communication with the third gearset, wherein the reverse idler shaft selectively drivingly coupled to a reverse drive gearset.

27. The dual-clutch transmission of claim 26 further including a third shift clutch operable to releasably drivingly couple the reverse drive gearset and the reverse idler shaft, wherein the reverse drive gearset is driven by the first gearset.

28. The dual-clutch transmission of claim 15 further including a differential in constant driving engagement with the output shaft.

29. The dual-clutch transmission of claim 15 wherein the first engine clutch and the second engine clutch each include clutch plates in engagement with a common member.

30. The dual-clutch transmission of claim 15 wherein the first and second engine clutches are normally closed clutches operable to transmit torque without an application of external force.

31. The dual-clutch transmission of claim 15 wherein the first engine clutch is positioned at one end of the first input shaft and the second engine clutch is positioned at an opposite end of the first input shaft.

32. A dual-clutch transmission for a vehicle having an engine and a driveline, comprising:
 first and second input shafts;
 a first engine clutch establishing a releasable drive connection between the engine and said first input shaft;
 a second engine clutch establishing a releasable drive connection between the engine and said second input shaft;
 a transfer shaft;
 an output shaft connected to the driveline;
 a first gearset having a first drive gear fixed for rotation with said first input shaft which is meshed with a first speed gear rotatably supported on said output shaft;
 a second gearset having a second drive gear fixed for rotation with said second input shaft which is meshed with a second speed gear rotatably supported on said transfer shaft;
 a third gearset having a third speed gear rotatably supported on said transfer shaft, a fourth speed gear rotatably supported on said output shaft, and a fifth speed gear rotatably supported on said first input shaft which is meshed with said third and fourth speed gears;
 a fourth gearset having a third drive gear fixed for rotation with said transfer shaft, a fourth drive gear fixed for rotation with said output shaft, and a sixth speed gear rotatably supported on said first input shaft which is meshed with said third and fourth drive gears, said fifth and sixth speed gears fixed for common rotation;
 a fifth gearset having a fifth drive gear fixed for rotation with said second input shaft meshed with a seventh speed gear rotatably supported on said output shaft;
 a first shift clutch operable for selectively coupling said first speed gear to said fourth speed gear;
 a second shift clutch operable for selectively coupling said second speed gear to said third speed gear;
 a third shift clutch operable for selectively coupling said seventh speed gear to said output shaft;
 a fourth shift clutch operable for selectively coupling said second speed gear to said transfer shaft; and
 a fifth shift clutch operable for selectively coupling said sixth speed gear to said first input shaft.

33. The dual-clutch transmission of claim 32 further comprising:
 a reverse gearset having a reverse shaft, a reverse drive gear fixed for rotation with said reverse shaft and meshed with said fifth speed gear, a first reverse speed gear rotatably supported on said reverse shaft, and a second reverse speed gear rotatably supported on said output shaft and meshed with said first reverse speed gear; and
 a sixth shift clutch operable for selectively coupling said first reverse speed gear to said reverse shaft.

34. The dual-clutch transmission of claim 33 further comprising a shift control system operable for coordinating actuation of said first and second engine clutches and all of said shift clutches to establish six forward drive connections and a reverse drive connection between the engine and the driveline.

35. A dual-clutch transmission for a vehicle having an engine and a driveline, comprising:
 first and second input shafts;
 a first engine clutch establishing a releasable drive connection between the engine and said first input shaft;
 a second engine clutch establishing a releasable drive connection between the engine and said second input shaft;
 a transfer shaft;
 an output shaft connected to the driveline;
 a first gearset having a first drive gear fixed for rotation with said first input shaft which is meshed with a first speed gear rotatably supported on said output shaft;
 a second gearset having a second drive gear fixed for rotation with said second input shaft which is meshed with a second speed gear rotatably supported on said transfer shaft;
 a third gearset having a third speed gear rotatably supported on said transfer shaft, a fourth speed gear rotatably supported on said output shaft, and a fifth speed gear rotatably supported on said first input shaft which is meshed with said third and fourth speed gears;
 a fourth gearset having a third drive gear fixed for rotation with said transfer shaft, a fourth drive gear fixed for rotation with said output shaft, and a sixth speed gear rotatably supported on said first input shaft which is meshed with said third and fourth drive gears;
 a first shift clutch operable for selectively coupling said first speed gear to said fourth speed gear; and
 a second shift clutch operable for selectively coupling said second speed gear to said third speed gear.

36. The dual-clutch transmission of claim 35 further comprising:
 a fifth gearset having a fifth drive gear fixed for rotation with said second input shaft and meshed with a seventh speed gear rotatably supported on said output shaft; and
 a third shift clutch operable for selectively coupling said seventh speed gear to said output shaft.

37. The dual-clutch transmission of claim 36 further comprising:
 a fourth shift clutch operable for selectively coupling said second speed gear to said transfer shaft; and
 a fifth shift clutch operable for selectively coupling said sixth speed gear to said first input shaft.

38. The dual-clutch transmission of claim 35 further comprising:
 a reverse gearset having a reverse shaft, a reverse drive gear fixed for rotation with said reverse shaft and meshed with said fifth speed gear, a first reverse speed gear rotatably supported on said reverse shaft, and a second reverse speed gear rotatably supported on said output shaft and meshed with said first reverse speed gear; and
 a third shift clutch operable for selectively coupling said first reverse speed gear to said reverse shaft.

39. A dual-clutch transmission for a vehicle having an engine and a driveline, comprising:
 first and second input shafts;
 a first engine clutch establishing a releasable drive connection between the engine and said first input shaft;
 a second engine clutch establishing a releaseable drive connection between the engine and said second input shaft;
 a transfer shaft;
 an output shaft connected to the driveline;
 a first gearset driven by said first input shaft;
 a second gearset driven by said second input shaft;
 a third gearset including a first gear rotatably supported on said output shaft, a second gear rotatably supported on said transfer shaft, and a third gear rotatably supported on said first input shaft and which is meshed with said first and second gears;
 a fourth gearset driven by said third gear of said third gearset and driving said transfer shaft and said output shaft;

a first shift clutch operable for selectively coupling said first gearset to said first gear of said third gearset; and a second shift clutch operable for selectively coupling said second gearset to said second gear of said third gearset.

40. The dual clutch transmission of claim 39 wherein said first gearset includes a first drive gear driven by said first input shaft which is meshed with a first speed gear rotatably supported on said output shaft, wherein said second gearset includes a second drive gear driven by said second input shaft which is meshed with a second speed gear rotatably supported on said transfer shaft, and wherein said fourth gearset includes a third drive gear fixed for rotation with said output shaft and a third speed gear rotatably supported on said first input shaft that is meshed with said third and fourth drive gears, and wherein said third speed gear is fixed for common rotation with said third gear of said third gearset.

* * * * *